United States Patent [19]

Inoue et al.

[11] 3,835,297

[45] Sept. 10, 1974

[54] MICROFILM PROVIDED WITH COLOR CODES AND DEVICE FOR RECORDING AND REPRODUCING SUCH CODES

[76] Inventors: Mutsuhiro Inoue, 4100-2, Isobe, Kanagawa-ken, Sagamihara-shi; Shunzo Inoue, 4-45-17, Minami Magome, Ohta-ku, Tokyo, both of Japan

[22] Filed: May 9, 1973

[21] Appl. No.: 358,485

Related U.S. Application Data

[63] Continuation of Ser. No. 111,057, Jan. 29, 1971, abandoned.

[30] Foreign Application Priority Data

Feb. 5, 1970 Japan .......................... 45/10141

[52] U.S. Cl. ............... 235/61.11 E, 235/61.12 N, 250/219 D, 346/74 P

[51] Int. Cl... G06k 19/06, G06k 7/12, G01n 21/30, G01d 15/14

[58] Field of Search ......... 204/114; 117/17; 96/1 R, 96/1 PE, 1 PS, 1 E, 1 PC; 346/74 P; 235/61.12 N, 61.12 R, 61.11 E, 61.11 R, 61.11 F, 61.7 B, 61.6 E; 250/219 D, 256; 340/146.3 K; 35/35, 48; 40/53; 353/26; 355/41

[56] References Cited

UNITED STATES PATENTS

| | | | |
|---|---|---|---|
| 2,953,300 | 9/1960 | O'Brian | 235/61.12 R |
| 3,060,429 | 10/1962 | Winston | 346/1 |
| 3,066,296 | 11/1962 | Ailman | 346/1 |
| 3,072,907 | 1/1963 | Boucher | 346/1 |
| 3,343,142 | 9/1967 | Clark | 346/74 P |
| 3,373,265 | 3/1968 | Smitzer | 235/61.12 R |
| 3,417,231 | 12/1968 | Stites | 235/61.11 E |
| 3,471,861 | 10/1969 | Mocovski | 346/74 P |
| 3,553,439 | 1/1971 | Dorman | 235/61.12 M |
| 3,585,369 | 6/1971 | Nather | 235/61.11 A |
| 3,594,581 | 7/1971 | Yamashita | 250/256 |

*Primary Examiner*—Daryl W. Cook
*Assistant Examiner*—Robert M. Kilgore
*Attorney, Agent, or Firm*—John Thomas Cella

[57] ABSTRACT

The invention consists in a microfilm provided with color index codes of at least two colors other than the colors for recording information on the microfilm, to thereby increase the facility to search for the index codes and accordingly a desired type of information recorded in the recording frames of the microfilm represented by such color codes. The invention also consists in a code recording device for additionally forming the said color index codes on a photographed microfilm in a light environment, and a reproducing device for reproducing the color index codes formed on the photographed microfilm.

4 Claims, 11 Drawing Figures

MICROFILM PROVIDED WITH COLOR CODES AND DEVICE FOR RECORDING AND REPRODUCING SUCH CODES

This is a continuation, of U.S. Pat. application Ser. No. 111,057, filed Jan. 29, 1971, now abandoned.

BACKGROUND OF THE INVENTION

1. Field of the Invention

This invention relates to a microfilm provided with color codes and to a device for recording and reproducing such color codes. More particularly, it relates to a device for recording and reproducing color codes formed on a photographed microfilm.

2. Description of the Prior Art

Microfilm can contain therein a great deal of informations within a very much limited space in a highly compact manner and its use is increasing in various fields.

For example, microfilm is used to keep various documents such as scientific and technological documents, data redords, catalogs, newspapers, checks, account books, etc. by photographing them to greatly reduced scales. It also finds an increased use in the technique known as COM (computer output microfiliming) whereby huge amounts of output informations from electronic computers are photographed on microfilms in a very compact manner. However, effective utilization of such great amounts of microfilmed information presupposes the provision of a satisfactory method of searching for any desired part of the recorded information.

In the past, the solution to this problem has been accomplished by providing index code marks known as grip marks in the margin of microfilm outside of the stored information and counting such marks to determine the numbers or addresses of the respective recording frames in the film.

According to this known method, an index code mark is detected by a photoresponsive element and the detection output thereof is applied to operate an electronic counter. The microfilm is moved to a desired frame position in accordance with the output of the electronic counter, whereupon the film is stopped for searching. On the other hand, the index codes available for a microfilm are limited in number because they must be provided in the limited margin of the microfilm, and to increase the number of such codes, the space alloted for the recording of the codes must be increased by sacrificing the space for recording the information. This would in turn result in a reduced recording capacity and decreased merits of microfilm as a compact recording medium.

Another known method of forming index codes on a microfilm is by photographing a predetermined number of index codes on the microfilm simultaneously with or before and after the photographing of information on the microfilm. This method, however, requires a predetermined number of index codes to be photographed on the film before the film loses its photosensitivity or before it is subjected to developing and fixing processes, and thus these processes as well as the photographing of the index codes must always be carried out in a dark environment, which of course involves quite combersome dark-room procedures. In addition, when the index codes to be formed on the microfilm include not only the so-called grip marks formed in the film margin but also additional index codes representing the types of information recorded on the film, the work of selecting from among such codes in accordance with their patterns must also take place in a dark environment and this makes the operation more troublesome and greatly reduces the advantage of the microfilm as a compact recording medium.

SUMMARY OF THE INVENTION

It is a primary object of the present invention to overcome the described various disadvantages which have existed in the prior art.

It is another object of the present invention to provide a microfilm having color codes as index codes to thereby increase the facility to search for the index codes.

It is still another object of the present invention to provide a code recording device for additionally forming index codes on a photographed of processed microfilm and in a light environment.

It is yet another object of the present invention to provide a code recording device for electrophotographically forming color index code marks on a microfilm.

It is another object of the present invention to provide a reproducing device for reproducing color index code marks formed on a photographed microfilm.

Microfilm used with the present invention may be any of the various known types such as silver salt film, diazofilm, Kalvar film (trade name) manufactured and sold by Kalvar Corporation or any other film which is composed of an insulating base of Myler (trade mark) or polyester and a photosensitive layer disposed thereon and formed of silver salt emulsion, diazonium salt or the like. Such microfilm allows electric charges imparted thereto by electrically charging means to be maintained thereon.

DESCRIPTION OF THE PREFERRED EMBODIMENTS

Figures 1, 2, 3, 4:
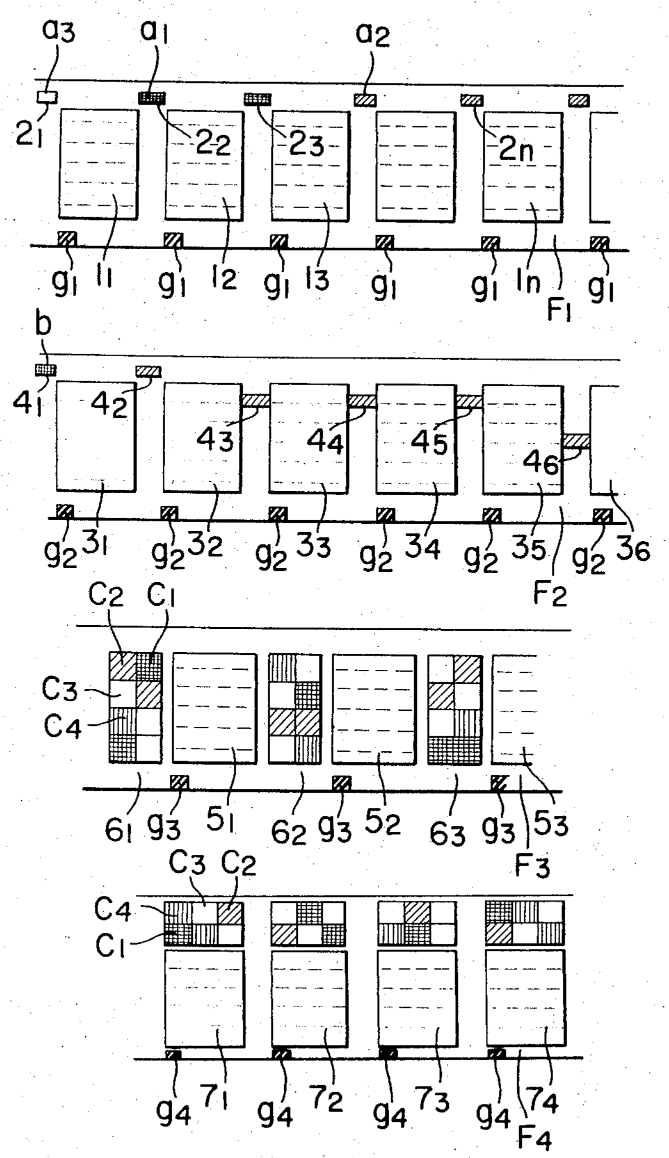
FIGS. 1 to 4 are plan views of microfilms provided with various forms of color index codes according to the present invention.

Referring to FIGS. 1 to 4, there are shown microfilms with various forms of color index codes produced by the inventive recording device which will be described. In FIG. 1, a microfilm F1 is composed of a base in the form of a thin film of synthetic resin such as polyester or Myler, and a photosensitive layer of silver salt emulsion or diazonium salt. A series of information recording frames $1_1$, $1_2$, $1_3$, . . . $1_n$ are formed by photographing on the photosensitive layer of the microfilm F1, and a plurality of color index codes $2_1$, $2_2$, $2_3$, . . . $2_n$ are attached to the photosensitive layer in the margin thereof in such a manner that the respective index codes are adjacent to the upper corners of the respective recording frames. The color index codes $2_1$, $2_2$, $2_3$, . . . $2_n$ may be provided by electrophotographic toners of three different colors $a_1$, $a_2$ and $a_3$ such as red, blue and yellow in accordance with the types of information photographed in the respective information recording frames $1_1$, $1_2$, $1_3$, . . . $1_n$.

More particularly, recording may be effected in such a manner that the same type of information is photographed in at least a group of recording frames, and the frames in respective groups are represented by index codes of the same color $a_1$, $a_2$, or $a_3$ so that the types of the information recorded in the respective frames can be discriminated by the different colors of the color index codes.

FIG. 2 shows another form of the microfilm with color index codes provided according to the present invention. Microfilm F2 carries thereon a series of information recording frames $3_1$, $3_2$ and so on and correspnding index codes $4_1$, $4_2$ and so on formed of electrophotographic toners of different colors such as blue *b* and red *r*. The colors of the index codes $4_1$, $4_2$ and so on are selected in accordance with the types of the information recorded in the recording frames $3_1$, $3_2$, and so on. This example is simlar to that of FIG. 1 in that the same color, for example, red *r*, is selected for the color index codes representing the same type of information photographed in the recording frames $3_2$ to $3_6$, but it should be noted that the color index codes $4_2$ to $4_6$ representing the group of frames $3_2 - 3_6$ containing the same type of information are offset transversely of the film F2 depending on the ordinal numbers suffixed to those index codes.

To discriminate the types of information on the microfilm F2 having such color index codes, the microfilm F2 may be scanned by an electrically driven reader to detect a desired group of frames with the aid of the color representative thereof, and then detect the ordinal number of a desired particular index code in that group with the aid of the transverse position thereof.

Thus, a viewer can visually carry out the searching operation simply by viewing the colors of the index codes on the microfilm as it is scanned by the electrically driven reader, and thus a highly efficient searching operation can be achieved substantially without fatiguing the sight of the viewer.

Further examples of the microfilm according to the present invention are shown in FIGS. 3 and 4. In FIG. 3, microfilm F3 also has a series of information recording frames $5_1$, $5_2$, $5_3$ and so on and color index code means $6_1$, $6_2$, $6_3$ and so on, each of which is provided by four different color marks $C_1$, $C_2$, $C_3$ and $C_4$ representing the types of information recorded in the respective frames. These different marks may be formed of colorants such as red for $C_1$, blue for $C_2$, yellow for $C_3$ and green for $C_4$.

It should be noted that the respective color index codes $6_1$, $6_2$, $6_3$ and so on are disposed in preceding and aligned relationship with the respective recording frames $5_1$, $5_2$, $5_3$ and so on longitudinaally of the microfilm F3. Since each index code consists of four colors, the types of information available for the microfilm F3 will be $4^n$ if the number of code marks in each code means is *n*. In FIG. 3, each code means 6 has eight code marks so as to provide $4^8$ code marks in all, which means that $4^8$ types of information can be recorded and discriminated from one another on the recording frames of the microfilm.

The microfilm F4 of FIG. 4 is a modification of that shown in FIG. 3, and this has a series of color index codes which per se are the same as those of FIG. 3 but disposed in the margin of the microfilm in transverse alignment with corresponding recording frames $7_1$, $7_2$, $7_3$ and so on.

In case of the microfilms as shown in FIGS. 3 and 4, the information searching operation may be achieved by the use of a reproducing device which will be later described with reference to FIGS. 6 to 8.

Each of the various microfilms shown in FIGS. 1 to 4 also carries thereon a plurality of grip marks $g_1$, $g_2$, $g_3$ or $g_4$ disposed along the opposite margin, these grip marks being used for counting the number of the recording frames.

Figure 5:
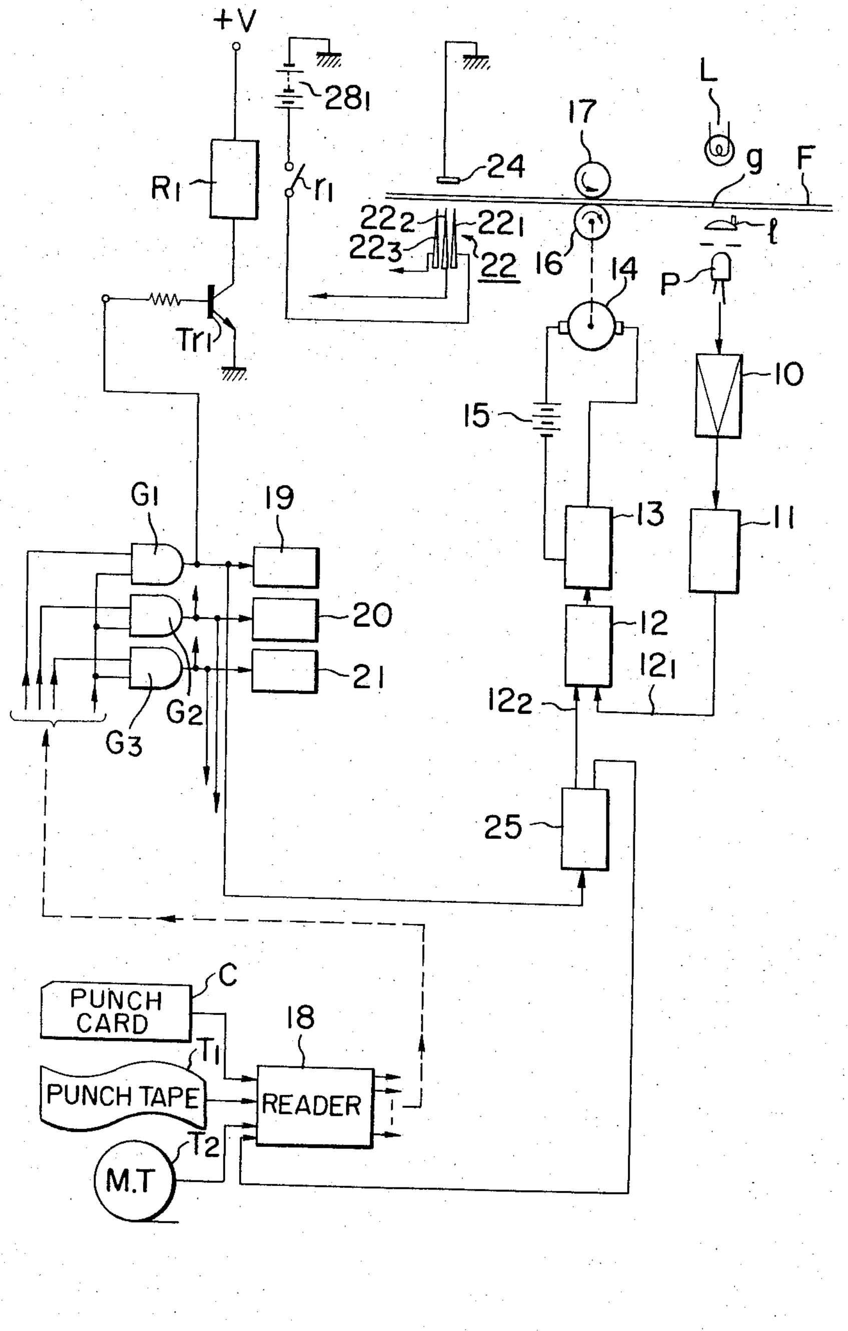
FIG. 5 is a diagrammatic representation of the color index code recording device according to the present invention.

FIG. 5 shows in block diagram a recording device for additionally recording color index codes on a photograpbed microfilm. F designates a photographed microfilm such as that shown in any of FIGS. 1 to 4, and *g* designates one of the grip marks described also with respect to FIGS. 1 to 4.

The recording device includes a grip mark illuminator lamp L, a focusing lens *l* and a photocell P, all of which are disposed in alignment with one another. The output of the photocell P is connected with a waveform shaping amplifier circuit 10 which is a Schmidt circuit for converting the output of the photocell P into a rectangular waveform. The output of the waveform shaping amplifier circuit 10 is in turn connected with a monostable multivibrator circuit 11, whose output is connected with a motor drive control circuit 12 constituted by a flip-flop and having a reset terminal $\mathbf{12}_1$ and a set terminal $\mathbf{12}_2$. The output of the control circuit 12 is connected with a switching circuit 13 which is a known electronic switching circuit closed and opened by a set and a reset output signal from the control circuit 12, respectively. A motor 14 and a DC power source 15 for the motor 14 are connected in series with the switching circuit 13. A capstan 16 driven from the motor 14 and a pinch roller 17 are disposed to pass therebetween the microfilm F with the pinch roller urged into contact with the microfilm.

At the bottom of FIG. 5, there is seen a reader 18 for card C or tapes $T_1$ and $T_2$. The card C or the tapes $T_1$ and $T_2$ are known recording mediums such as punched card or magnetic or punched tapes, and such recording mediums store therein not only encoded information corresponding to the information photographed on the microfilm F but also punched or magnetically recorded information representing the color index codes to be formed on the microfilm and the ordinal numbers of the information recording frames.

Gates G1, G2 and G3 are provided to selectively drive valve driving circuits 19, 20 and 21 in response to color index code signals applied from the reader 18 to the gates. Reference numeral 22 generally designates ink injector nozzle means comprising three finediametered pipes shown as three lines $\mathbf{22}_1$, $\mathbf{22}_2$ and $\mathbf{22}_3$, to which is supplied ink from three ink supply sources of different colors (not shown) through valves.

The three nozzle terminals of the nozzle 22 are capillary tubes formed of conductive material and having an inner diameter of 0.127 mm, and these nozzle terminals are supplied with different colors of ink and spaced apart from the surface of the microfilm F by a distance in the range of 1 to 1.1 mm. These nozzle terminals $22_1 - 22_3$, as typically indicated by the line $22_1$, are connected with a high voltage source $23_1$ of about 2,000 volts through a contact $r_1$ which is operated by a relay $R_1$. The relay $R_1$ is connected with the collector of a transistor $Tr_1$, which may be rendered conductive by the output from the gate G1. Thus, when an output is derived at the gate G1 in response to the color index code signal read out from the card C or Tape $T_1$ or $T_2$, a high voltage is applied to the nozzle $22_1$ through the relay $R_1$ so that ink in the nozzle $22_1$ may be injected through the nozzle capillary tubes onto the surface of the microfilm F with the aid of electric field. In opposed relationship with the nozzle means 22 there is disposed a grounded electrode 24 with the microfilm F interposed therebetween.

The technique of supplying ink into such nozzle and injecting the ink therethrough by applying an electric field of high intensity to the nozzle is well known in the art as disclosed in U.S. Pat. No. 3,060,429 and German Pat. Publication No. 1,187,816, and these patents may be referred to for the details of such means.

In FIG. 5, there is further provided a delay circuit 25 for delaying the output signals from the gates G1, G2 and G3 and applying them to the set terminal of the flip-flop 12. Although the gate G1 alone is shown connected with the delay circuit 25, the other two gates G2 and G3 are similarly connected with the delay circuit.

With the described arrangement, when the punched card C having information corresponding to a predetermined frame in the microfilm F is applied as input, the information signal representing the ordinal number of that frame is first read by the reader 18 to energize the motor 14 through an unshown microfilm feeder circuit. When the microfilm is thus fed to a predetermined frame position, the photocell P reads the grip mark g on the microfilm to set the monostable multivibrator 11 and reset the flip-flop 12 to thereby stop the motor 14.

Although there is shown no means for reading the information representing the ordinal number of the recording frame so recorded on the card and stopping the movement of the microfilm at a position corresponding to such ordinal number, this may be accomplished by such means as disclosed in Japanese Pat. No. 464,595.

After the film F is thus stopped, the reader 18 further applies a color index code information signal on the card C selectively to the gates G1, G2 and G3 to thereby selectively open these gates to allow a colorant ink to be supplied selectively to the nozzle 22 through the valve means connected to the selectively opened gates. At the same time, the output signal of the thus opened gate turns on the transistor connected with the output circuit of that gate, thereby energizing the relay to apply a high voltage to the nozzle 22.

It is now assumed that the gate G1 is opened by the color index code signal as shown in FIG. 5. Then the output signal of this gate G1 energizes the relay $R_1$ to close its contact $r_1$ and thereby allow a high voltage to be applied from the high voltage source $23_1$ to the nozzle $22_1$. Since the nozzle $22_1$ is concurrently supplied with colorant ink through the associated valve opened by the valve dring means 19, the high voltage applied to the nozzle $22_1$ causes the supplied ink to be injected toward the surface of the microfilm F and stick thereto.

The position of the nozzle 22 relative to the microfilm F may be varied with the various types of microfilms F1. F2, F3 and F4 shown in FIGS. 1 to 4. When the microfilm F1 of the FIG. 1 is to be produced, a set of nozzles 22 is disposed so that the upper left corner of one of the recording frames $1_1$, $1_2$, etc. as viewed in FIG. 1 may be registered with the nozzle when the film F1 is stopped. When the film F2 of FIG. 2 is desired, plural sets of nozzles $22_1 - 22_3$ for different colors of ink must be disposed transversely of microfilm. This is also the case with the films F3 and F4 of FIGS. 3 and 4.

If the area of contact between the microfilm F and the ink material injected from the nozzle 22 is insufficient, a deflecting electrode may be additionally provided between the nozzle 22 and the film F to apply a deflecting voltage to the nozzle so as to provide a sufficient area of contact as desired.

When the ink is being injected through the nozzle 22, the output from the gate G1 is delayed by the delay circuit 25 and then resets the flip-flop, and therefore the motor 14 is stopped after the microfilm F is fed frame by frame.

Thus, when another punched card C corresponding to the information recorded in the next frame of the microfilm is applied as input to the reader 18, the microfilm F remains stopped so as to enable a color index code to be attached to the microfilm in accordance with the color index code signal on that card C.

Figure 9:
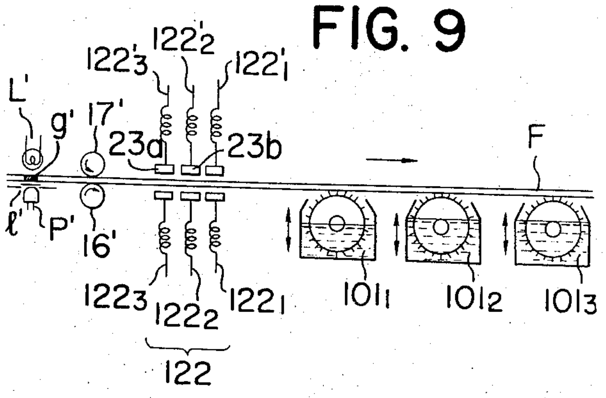
FIG. 9 is a schematic representation of a modified color index code printer portion.

Formation of color index codes on the microfilm may alternatively be accomplished by a device for forming ordinary electrophotographic color image as shown in FIG. 9, wherein letters L′, *l*′, P′ and *g*′ correspond to the lamp L, focusing lens *l*, photocell P and grip mark *g* shown in FIG. 5. The device of FIG. 9 employs an electrically charging electrode generally indicated at 122 instead of the nozzle 22 shown in FIG. 5, the electrode 122 comprising three pairs of electrically charging poles $122_1$ and $122_1'$, $122_2$ and $122_2'$, $122_3$ and $122_3'$ opposed to each other with the microfilm F interposed therebetween.

High voltages of the opposite polarities are applied selectively to such opposed charging poles in accordance with the color index codes to be formed on the microfilm. For example, positive and negative high voltages are applied to the charging poles $122_1$ and $122_1'$ respectively. Thus, the opposite surfaces of the microfilm F may be electrically charged with the opposite polarities. Three liquid developing means $101_1$, $101_2$ and $101_3$ are provided which are adapted to be urged into contact with the lower surface of the microfilm F in response to the high voltages selectively applied to the electrode pairs $122–122_1'$, $122_2–122_2'$ and $122_3–122_3'$ in accordance with the color index code signals. More specifically, these developing means are such that when high voltages are applied to the electrode pair $122_1–122_1'$ the developing means $101_1$ is only urged into contact with the microfilm F while the other two developing means $101_2$ and $101_3$ are separated from the microfilm.

However, where a number of colored marks must be formed as color index codes on the microfilm as shown in FIG. 3 or 4, high voltages are applied to one of the charging electrode pairs 122 to electrically charge the microfilm, which is then developed by the liquid developing means and thereafter must be rewound to enable the repetition of the similar process as frequently as required by the number of colors in use.

The above-described electrophotographic color printing technique is known in the art and may be successfully achieved as by using the liquid developing method as disclosed in Japanese Pat. Publication No. 10,197/1964.

Figure 6:
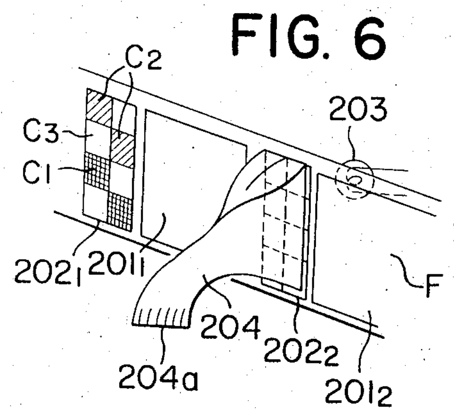
FIG. 6 is a perspective view showing the code readout portion of the microfilm color index code reproducing device according to the present invention.

Referring to FIG. 6, there is particularly shown the read-out portion of the device for reproducing the color index codes additionally formed on the photographed microfilm in the described manner. The photographed microfilm F has color index codes $202_1$, $202_2$ and so on formed thereon corresponding to information recording frames 201, 202 and so on. These color index codes $202_1$, $202_2$ and so on are formed of different colorant inks or toners $C_1$ (red), $C_2$ (green) and $C_3$ (blue), As shown, the read-out portion includes a light source 203 for illuminating the color index codes, and a glass fiber 204 having a light-conveying end surface **204*a*. From the light-conveying end surface 204*a* are led out the color index codes, which are shown as six code marks in FIG. 6.**

FIG. 7(A) illustrates the light receiving portions of photoelectric means for receiving the color index codes appearing at the light-conveying end surface **204*a* of the glass fiber 204 and converting such codes into electric signals. A color filter $206_1$ driven from a motor M1 is constituted by three different portions such as red filter portion 206*a* for passing red light alone, green filter portion 206*b* for passing green light alone, and blue filter portion 206*c* for passing blue light alone. Below the color filter 206 there is disposed a photocell $207_1$**.

The light receiving portions of the photoelectric means shown in FIG. 7(A) are provided in the respective color index code mark directing portions of the light-conveying end surface **204*a*. For the microfilm F shown in FIG. 6, eight pairs of such light receiving portions are provided corresponding to the code marks. The motor M1 for rotating the color filter $206_1$ forming one of the eight light receiving portions provided in the end surface 204*a* of the glass fiber 204 is driven by a control circuit shown in FIG. 8(A). In FIG. 8(A), a keyboard 301 is used to apply as input the code signal representing the index code $202_1$ in order to detect a desired information recording frame such as 201 in the microfilm F. Further provided is a matrix decoder circuit $302_1$ to which are connected in series shunt resistors $R_1$, $R_2$ and $R_3$, of which $R_1$ receives a positive DC voltage from a voltage source +Vc. A voltage comparator circuit $303_1$ comprising a known differential amplifier circuit is in turn connected with the output of the matrix decoder circuit $302_1$. The voltage comparator circuit $303_1$ is in turn connected with the color filter driving motor M1 whose rotary shaft drives the slidable terminal of a variable resistor VR1. Thus, when a DC voltage Vc is applied, a voltage corresponding to the rotational phase of the motor shaft is applied to the voltage comparator $303_1$**.

Although only one of the eight light receiving units in the photoelectric means is shown in FIG. 8(A), it will be readily appreciated that the other seven such units are similarly provided with decoders $302_2$, $302_3$ and so on, comparator circuits $303_2$, $303_3$ and so on, motors M2, M3 and so on, and variable resistors VR2, VR3 and so on.

Figure 8A:
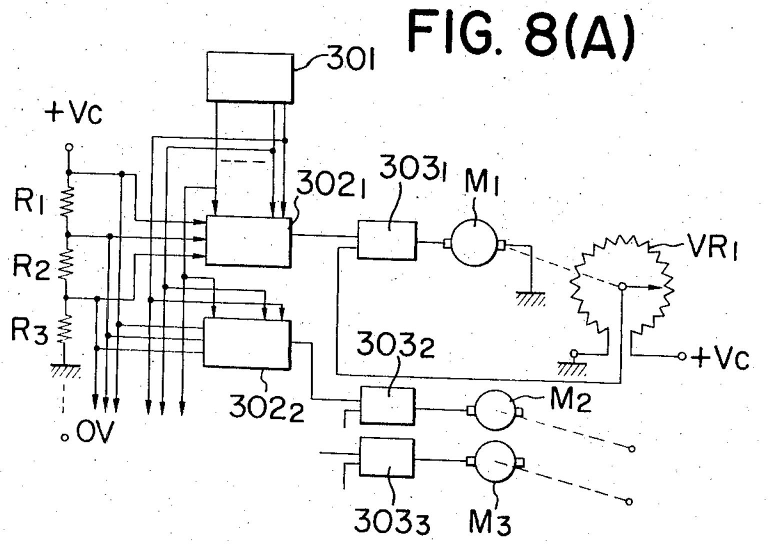
FIG. 8(A) is a diagram of the control circuit for driving the photoelectric converter element of FIG. 7.
Figure 8B:
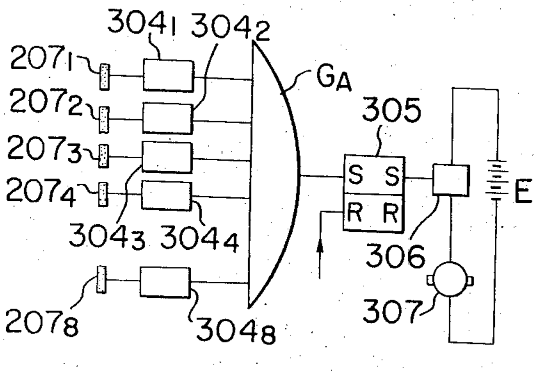
FIG. 8(B) diagrammatically shows the construction of the color index code reproducing device according to the present invention.

As shown in FIG. 8(B), the outputs of photocells $207_1$ – $207_8$ in the light receiving units are shaped by waveform shaping circuits $304_1$ – $304_8$ and connected with the input of "AND" gate GA. The output of the "AND" gate is connected with the set input terminal S of flip-flop circuit 305, which in turn is connected with a switching circuit 306. Switching circuit 306 and motor 307 for driving the film transport capstan (not shown) are connected in series with a power source E. The reset input terminal R of the flip-flop circuit 305 receives a reset signal from the keyboard 301 to reset the flip-flop.

Figure 7:
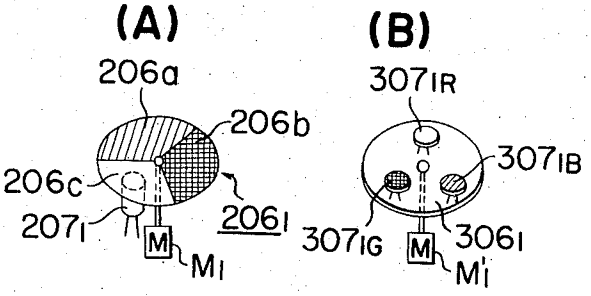
FIGS. 7(A) and 7(B) are schematic illustrations of the essential part of the photoelectric converter element incorporated in the code read-out portion of FIG. 6.

Description will now be made of the searching operation carried out by the color index code reproducing device as shown in FIGS. 6 to 8. The operator first refers to an associated code book or the like for the color index code corresponding to any desired recording frame on the microfilm, e.g. color index code $202_1$ for the recording frame $201_1$, and then the data thus obtained about that particular code is applied as input through the keyboard 301. This causes the decoder circuit $302_1$ – $302_8$ selectively to provide an output divided by resistors $R_1$, $R_2$ and $R_3$ in the voltage divider circuit in accordance with the applied index code signal, and such output is selectively applied to the voltage comparator circuits $303_1$ – $303_8$. When any difference is found between the outputs of decoder circuits $302_1$ – $302_8$ and the voltages from variable resistors VR1-VR8 in accordance with the position of the slides of these variable resistors, the motor rotates a predetermined amount corresponding to the difference in such a direction that the differential voltage becomes zero.

Thus, the color filters $206_1$ – $206_8$ on the motor shafts are selectively moved so that the filter portions corresponding to the color of the mark forming the color index code corresponding to the desired recording frame come to overlie the photocells $207_1$ – $207_8$. Subsequently, a button to be searched for in the keyboard 301 is depressed to reset the flip-flop 305, whereby the switching circuit 306 is closed to energize the motor 306 which starts to drive the microfilm F.

When photocells $207_1$ – $207_8$ receive the index code $202_1$ corresponding to the desired recording frame $201_1$ on the microfilm F, the filters overlying the photocells produce electric signals from their filter portions preadjusted so as to pass the color of that code, thereby opening the "AND" gate GA to set the flip-flop. As the result, the switching circuit 306 is closed to stop the motor 307 and accordingly stop the microfilm F at a position corresponding to the desired frame $201_1$. Thus, the searching operation is completed.

In the light receiving unit of the photoelectric means, the color filter as indicated by $206_1$ in FIG. 7(A) may be replaced by a disc $306_1$ as shown in FIG. 7(B) and photocells $307_{1G}$, $307_{1R}$ and $307_{1B}$ may be disposed on the disc $306_1$, these photocells being only responsive to green, red and blue respectively. The disc is driven from motor M1 so as to selectively receive the light from the end surface **204*a* of the glass fiber 204.** In this case, there is obtained the same result as that described above.

As has been described above, the present invention uses different colors for the microfilm index code marks, and when the number of the index code marks in use is $n$, the types of information available for such microfilm will be $4^n$ for four colors including black, as compared with $2^n$ types provided by the prior art using two colors such as black and white. Thus, the searching capacity of the microfilm is sharply increased.

Further, the present invention enables color index codes to be additionally formed on a photographed balck-and-white microfilm of the conventional type without requiring any cumbersome dark-room treatment, and the formation of such color index codes enhances the utility of the microfilm as a compact recording medium which is highly effective for data treatment.

The various embodiments have been shown and described only for the illustrative purposes, and it should be understood that many changes and modifications may be made in the present invention without departing from the spirit thereof as defined in the appended claims.

We claim:

1. An information searching device for searching a desired information recording frame of a microfilm, which has a series of information recording frames and iindex codes, in response to said frames, said index codes consisting of color codes composed of at least two colors other than the colors used in said information recording frames, and of a plurality of color marks arranged in the form of matrixes comprising:

means for feeding said microfilm, light source means for irradiating said index codes of said microfilm thus fed, a plurality of detecting means provided in the same number as those of said color marks of said index code for independently detecting individual colors of each color mark of said index codes, said detecting means having at least one photoelectric element generating a detecting signal sensitive to the spectrum corresponding to a color of said color mark, converting means for switching the spectral sensitivity of said photoelectric element so that said photoelectric element of said detecting means selectively sensitizes to spectrums corresponding to at least two colors of said index codes, control means, actuated by color index code information signals, for controlling said converting means in order that said photoelectric element of said detecting means be sensitized in response to the spectrum corresponding to a color of said color marks forming an index code corresponding to a desired information recording frame to be searched, and microfilm stopping means, coupled to said detecting means, for stopping said microfilm when all of the detecting means generate detecting signals at the same time.

2. An information searching device according to claim 1, wherein said converting means is disposed in front of said photoelectric element and includes color filters corresponding in number to said color marks, each filter having a filter portion for transmitting the light having the wave length in a specific range, and a motor for shifting said color filter, said control means is connected to a driving circuit for said motor and includes a positional control circuit to rotate said motor with a predetermined value in order that said filter portion for transmitting the light having the wave length in a specific range is properly positioned in front of said photoelectric element.

3. An information searching device according to claim 1, wherein said detecting means have photoelectric elements corresponding in number to the colors of aid code marks, said photoelectric elements having individual spectrum sensitivites corresponding to said colors, and said converting means includes a photoelectric supporting member for supporting thereon said photoelectric elements, respectively, and a motor for displacing said photoelectric supporting member, and said control means is connected to a driving circuit for said motor and includes a positional control circuit to rotate said motor with a predetermined value in order that said photoelectric element, having a specific spectrum sensitivity receives light from said color marks.

4. An information searching device according to claim 3, wherein said control means includes a first voltage generating circuit for generating a predetermined voltage in association with said converting means, a second voltage generating circuit for generating a predetermined voltage in response to an input information signal corresponding to an index code for searching a desired information recording frame, and a differentiation circuit, to which is applied the output voltages from said first and from said second voltage generating circuits, for generating a difference voltage between them, said differentiation circuit being connected to said converting means and switching said converting means in response to an output voltage thereof.

* * * * *

UNITED STATES PATENT OFFICE
CERTIFICATE OF CORRECTION

Patent No. 3,835,297 Dated September 10, 1974

Inventor(s) MUTSUHIRO INOUE AND SHUNZO INOUE

It is certified that error appears in the above-identified patent and that said Letters Patent are hereby corrected as shown below:

In the heading please insert:

--Assignee: Canon Kabushiki Kaisha, Tokyo, Japan--;

Column 4, line 26, "photograpbed" should read --photographed--;

Column 5, line 53, "Japanese Pat. No. 464,595" should read --Japanese Pat. No. 474,595--;

Column 9, line 29, "iindex" should read --index--;

Column 10, line 26, "aid" should read --said--.

Signed and sealed this 17th day of December 1974.

(SEAL)
Attest:

McCOY M. GIBSON JR.
Attesting Officer

C. MARSHALL DANN
Commissioner of Patents